(12) United States Patent
Weaver

(10) Patent No.: US 6,694,087 B1
(45) Date of Patent: Feb. 17, 2004

(54) PROCESSING AUDIO-VISUAL DATA

(75) Inventor: Dale Matthew Weaver, Wheaton, IL (US)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 09/285,355

(22) Filed: Apr. 2, 1999

Related U.S. Application Data (63) Continuation-in-part of application No. 09/055,078, filed on Apr. 3, 1998, now abandoned.

(51) Int. Cl.[7] .................................................. H04N 5/93
(52) U.S. Cl. ............................ 386/52; 386/65; 345/723
(58) Field of Search ............................ 386/46, 52, 54, 386/55, 65, 53; 345/723

(56) References Cited

U.S. PATENT DOCUMENTS

| | | | | |
|---|---|---|---|---|
| 4,970,608 A | | 11/1990 | Fukuda et al. ................. | 386/52 |
| 5,218,672 A | | 6/1993 | Morgan et al. ................. | 386/55 |
| 5,659,793 A | * | 8/1997 | Escobar et al. ........... | 707/500.1 |
| 5,717,869 A | * | 2/1998 | Moran et al. ................. | 345/716 |
| 5,726,717 A | | 3/1998 | Peters et al. ................. | 348/593 |
| 5,732,184 A | | 3/1998 | Chao et al. .................... | 386/55 |
| 5,758,180 A | | 5/1998 | Duffy et al. ................. | 345/328 |
| 5,760,767 A | * | 6/1998 | Shore et al. ................. | 345/723 |

FOREIGN PATENT DOCUMENTS

GB    2 289 558    11/1995

* cited by examiner

*Primary Examiner*—Huy Nguyen
(74) *Attorney, Agent, or Firm*—Gates & Cooper LLP (57) ABSTRACT

Audio data and visual data are processed by providing storage devices (211, 212) for storing digital samples which are then read in response to edit events defined by a timeline (352, 353). Active audio tracks are processed in real time and an event, such as a cross-fade, defined by a single track that requires two interacting tracks of material, is identified. The location of events within available tracks is re-arranged so as to reduce the total number of active tracks required during playback. In effect, events are transferred to blank regions of existing tracks, thereby allowing both of the interacting tracks of cross-fades to be read without requiring additional track capacity during playback. In this way, an event defined by two interacting tracks is processed without requiring additional processing capacity.

36 Claims, 11 Drawing Sheets

PROCESSING AUDIO-VISUAL DATA

This application is a continuation-in-part of application Ser. No. 09/055,078, filed Apr. 3, 1998, now abandoned.

FIELD OF THE INVENTION

The present invention relates to processing audio-visual data in which digital samples are read from storage media in response to edit events defined in a time line.

BACKGROUND TO THE INVENTION

Traditional video editing involves the copying of video material from source tape onto an edited tape. Sophisticated tape editing equipment is required and the process can be relatively time consuming, given that it is necessary to configure the equipment in order for the video material to be transferred correctly. Furthermore, editing of this type leads to image degradation therefore the number of layers that may be introduced for compositing is limited.

In order to optimise expensive on-line editing equipment, off-line editing systems are known in which compressed video images are manipulated rapidly, by accessing image data in a substantially random fashion form magnetic disc storage devices. Given that it is not necessary to spool linearly through lengths of video tape in order to perform editing of this type, the editing process has generally become known as "non-linear editing". Initially, systems of this type would generate edit decision lists such that the on-line editing process then consists of performing edits once in response to an edit decision list. However, the edit decision list itself could be created in a highly interactive environment allowing many potential edits to be considered before a final list is produced.

The advantages of non-linear editing have been appreciated and high-end systems are known, such as that licensed by the present assignee under the Trade Mark "FIRE" in which full bandwidth signals are manipulated at full definition, without compression.

In a high-end system, it is possible to specify hardware requirements in order to provide a required level of functionality. Thus, systems tend to be designed to achieve a specified level of service; being tailored to suit a user's particular demands. However, as the power of processing systems has increased, along with an increase in data storage volumes and access speeds, it has become increasingly possible to provide sophisticated on-line non-linear editing facilities for more general purpose platforms. However, when working with such platforms the extent to which hardware facilities may be enhanced in order to provide particular functionality is more limited. Consequently, there is a greater emphasis towards providing enhanced functionality by making optimum use of the processing capacities available.

SUMMARY OF THE INVENTION

According to a first aspect of the present invention, there is provided editing apparatus, including storage means configured to store digital samples; display means configured to display symbolic representations of edit events within tracks; and processing means configured to identify event locations and to move portions of edit events to alternative tracks so as to enhance processing performance.

In a preferred embodiment, the processing means is configured to identify an event defined on a single track but requiring two interactive tracks and to transfer material to one of said interacting tracks to a blank region of another track, thereby allowing both of said interacting tracks to be played without allocating additional track resource.

According to a second aspect of the present invention, there is provided a method of processing audio visual data in which digital samples are read from storage media in response to edit events identified symbolically within tracks, wherein an improved event location is identified on a different track, and said identified event is moved to said improved location so as to reduce the overall processing requirement.

DETAILED DESCRIPTION OF THE PREFERRED EMBODIMENTS

The invention will now be described by way of example only with reference to the previously identified drawings.

Figure 1:
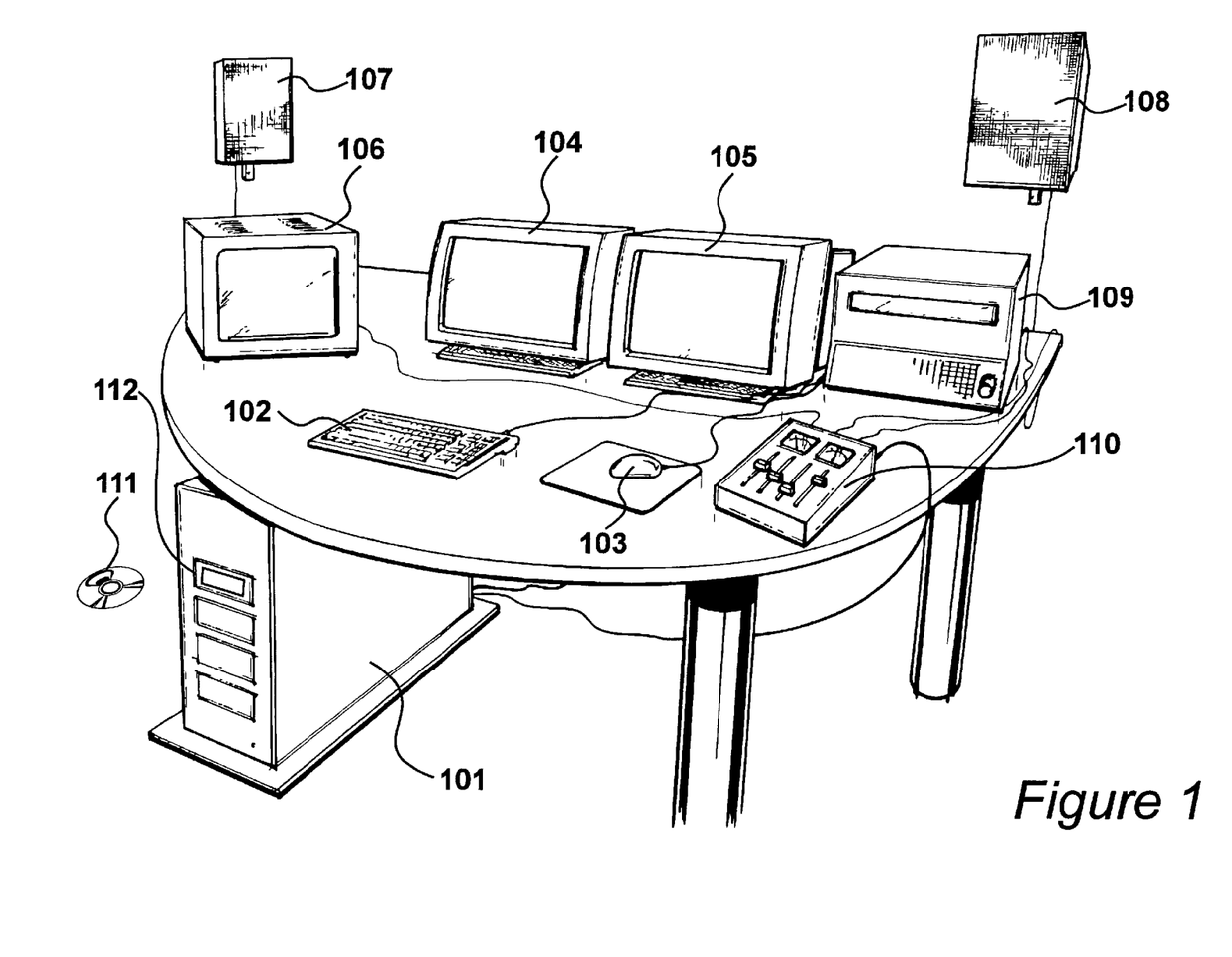
FIG. 1 shows a non-linear digital editing suite, having a processing system, monitors and recording equipment.

A non-linear editing suite is shown in FIG. 1 in which a processing system 101 receives manual input commands from a keyboard 102 and a mouse 103. A visual output interface is provided to an operator by means of a first visual display unit (VDU) 104 and second similar VDU 105. Broadcast-quality video images are supplied to a television type monitor 106 and stereo audio signals, in the form of a left audio signal and a right audio signal, are supplied to a left audio speaker 107 and to a right audio speaker 108 respectively.

Video source material is supplied to the processing system 101 from a high quality tape recorder 109 and edited material may be written back to said tape recorder. Recorded audio material is supplied from system 101 to an audio mixing console 110 from which independent signals may be supplied to the speakers 107 and 108, for monitoring audio at the suite, and for supplying audio signals for recording on the video tape recorder 109. Operating instructions executable by the processing system 101 are received by means of a computer-readable medium such as a CD ROM 111 receivable within a CD ROM player 112.

Figure 2:
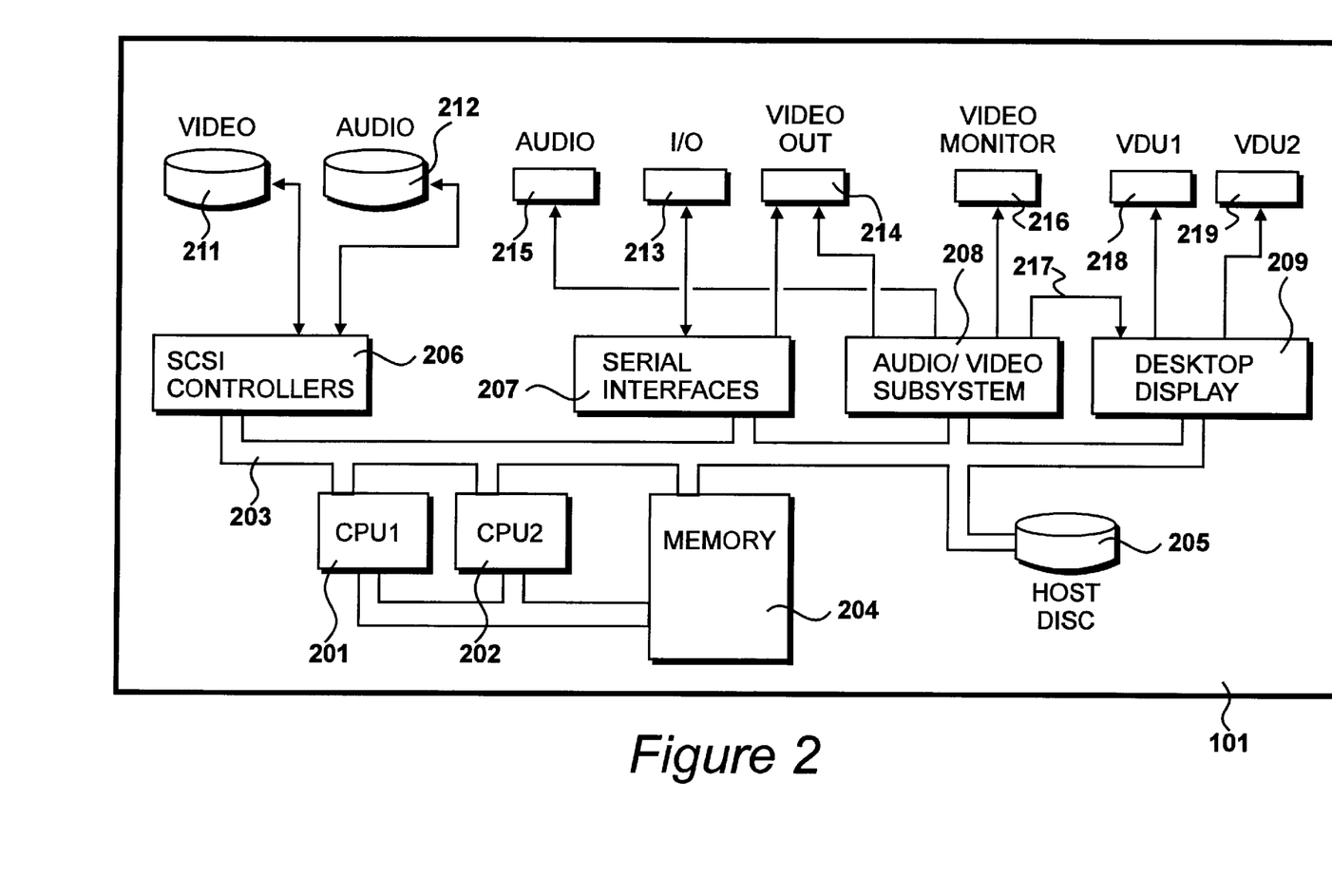
FIG. 2 details the processing system shown in FIG. 1, including a memory device for data storage.

Processing system 101 is detailed in FIG. 2 and may be summarised as a dual "Pentium Pro" machine. A first processing unit 201 and a second processing unit 202 are interfaced to a PCI bus 203. In the example shown, the processors 201 and 202 are clocked at 233 MHz and these devices communicate directly with an internal memory 204 of one hundred and twenty-eight megabytes, over a high bandwidth direct address and data bus, thereby avoiding the need to communicate over the PCI bus during processing except when other peripherals are being addressed. In addition, permanent data storage is provided by a host disc system 205 of four gigabytes, from which operating instructions for the processors may be loaded to memory 204, along with user generated data and other information. In addition to the host environment, Small Computer System Interface (SCSI) controllers 206, serial interfaces 207, an audio-visual/subsystem 208 and desktop display cards 209 are also connected to the PCI bus 203.

SCSI controllers 206 interface video storage devices 211 and audio storage devices 212. In the present embodiment, these storage devices are contained within the main system housing shown in FIG. 1 although, in alternative configurations, these devices may be housed externally.

Video storage devices 211 are configured to store compressed video data and typically said video data is striped across four, nine-Giga-byte drives. A similar arrangement is provided for the audio storage devices 212 which typically consist of four, four-Giga-byte drives again configured as a striped array. Sufficient bandwidth is provided, in terms of the video storage devices 211 and the SCSI controllers 206, to allow two video streams of data to flow over the PCI bus 203 in real time. Although the video data is compressed, preferably using conventional JPEG procedures, the data volume of video material is still relatively large compared to the data volume of the audio material. Thus, the audio storage devices 212 in combination with SCSI controllers 206 provide sufficient bandwidth for in excess of one hundred audio channels to be conveyed over the PCI bus 203 in real time.

Serial interfaces 207 interface with control devices 102 and 103 etc. via an input/output port 213, in addition to providing control instructions for video tape recorder 109 via a video interface port 214. The video interface port 214 also receives component video material from the audio-visual subsystem 208.

The audio-visual subsystem 208 may include a Truevision Targa 2000 RTX board configured to code and decode between uncompressed video and JPEG compressed video at variable compression rates. A limited degree of signal processing is provided by subsystem 208, under the control of the CPUs 201/202 and audio output signals, in the form of a left channel and a right channel, are supplied to an audio output port 215. Television monitor 106 receives luminance and chrominance signals from subsystem 208 via a video monitor interface 216 and a composite video signal from subsystem 208 is supplied to the desktop display subsystem 209, via link 217.

The system operates under the operating system "Windows NT" and is preferably configured under "NT 4.0". Desktop display 209 includes two VDU driver cards operating in a dual monitor configuration, thereby making the resources of both cards available to the operating system, such that they are perceived as a single large desktop configured with 2048 by 768 pixels. The desktop drivers support video overlay, therefore video sequences from the audio-visual subsystem 208 may be included with the VDU displays in response to receiving the composite signal via link 217. Thus, VDU 104 is connected to VDU interface 218 with VDU 105 being connected to interface 219. However, in operation, the VDUs provide a common desktop window, allowing application windows to be arranged on the desktop in accordance with user preferences.

Figure 3:
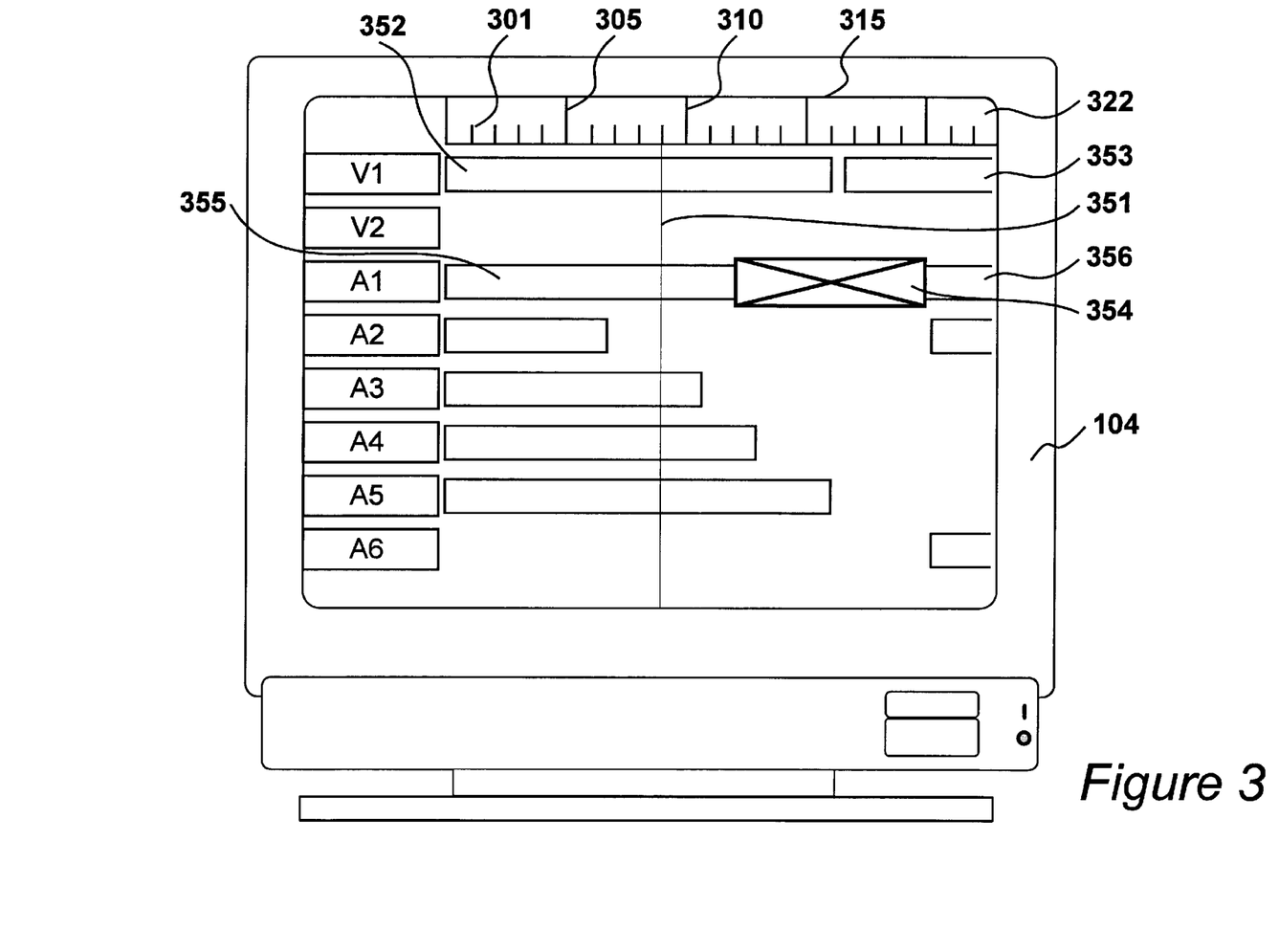
FIG. 3 shows a typical time-line display displayed on a VDU of the type shown in FIG. 1.

The editing suite shown in FIG. 1 facilitates timeline editing by displaying timelines on monitor 104, as shown in FIG. 3. Frame numbers 301 to 322 are shown at the top of the display representing timecode for output frames. Individual output frames may be viewed and a particular output frame may be selected by means of a vertical position line 351. Thus, as output images are being displayed, position line 351 traverses across the image from left to right. In its present position, position line 351 is identifying frame 309.

For the purposes of this example, it is assumed that video material and audio material may be processed in real time when accessing source material from a total of two video sources in combination with source material from a total of six audio sources. Many more than six audio sources could be made active but when more than six audio sources or tracks are made active for playback purposes, real time operation cannot be guaranteed. In a video source track, such as track V1 or track V2, source material is identified by a timeline and reference to the selected source material is included within the timeline. Thus, source material is identified in video timeline V1 in which a cut occurs after frame 316 from video source material 352 to source material 353.

During the playing of video source material 352, audio material is being played from audio tracks A1,A2,A3,A4 and A5. After the transition, such that video source material is received from source 353, audio material is received from tracks A1,A2 and A6.

A cut, as illustrated with respect to video track V1, is relatively easy to achieve given that from frame 317 onwards video material is read from source 353 instead of being read from source 352. Edit points are selected in the source material and source timecodes are stored such that the required material is read from its correct position when required in the output stream. In addition to cuts, it is also possible to define a wipe or a dissolve such that, over a transition period, material is derived from two sources with gradual mixing occurring from one source to the other.

In order to provide a coherent editing environment, effects similar to wipes and dissolves may be specified in the audio environment. In a video dissolve, one image is gradually replaced by another at each location throughout the image. Thus, a similar effect may be achieved with the audio signals by gradually decreasing the volume of one source while simultaneously increasing the output volume of another. In audio systems, such a procedure is usually referred to as a cross fade, given that the first source is being faded down while the second source is being faded up.

In the example shown in FIG. 3, an audio dissolve or cross-fade has been specified for audio track A1 by means of an audio dissolve icon 354. From an operators point of view, audio source material 355 is placed into audio track A1 up to an including output frame 316. At frame 317 track A1 cuts to audio source 356, thereby creating a similar transition to that provided for video track V1. Transition effects are then selected and an audio dissolve icon 354 is dragged and dropped at the cut transition between sources 355 and 356.

Thus, the audio output from track A1 still consists of source 355 being played followed by source 356 being played. However, there is no longer an abrupt cut from one source to the other. Instead, source 355 starts to be faded down from frame 313 with source 356 being faded up from this position. Thus, over frames 313 to 320, audio material is derived from both source 355 and from source 356. This requires two input audio streams to be processed and it is not possible for both of these audio streams to be physically supplied to the processing system via audio track A1. In reality, source 355 must be extended from its notional cut position to the end of frame 320, to provide source material for the fade out. At the start of frame 313 source material is required for source 356 and, in order to provide this source material to the processing system, it must be made available by another audio track.

Figure 4:
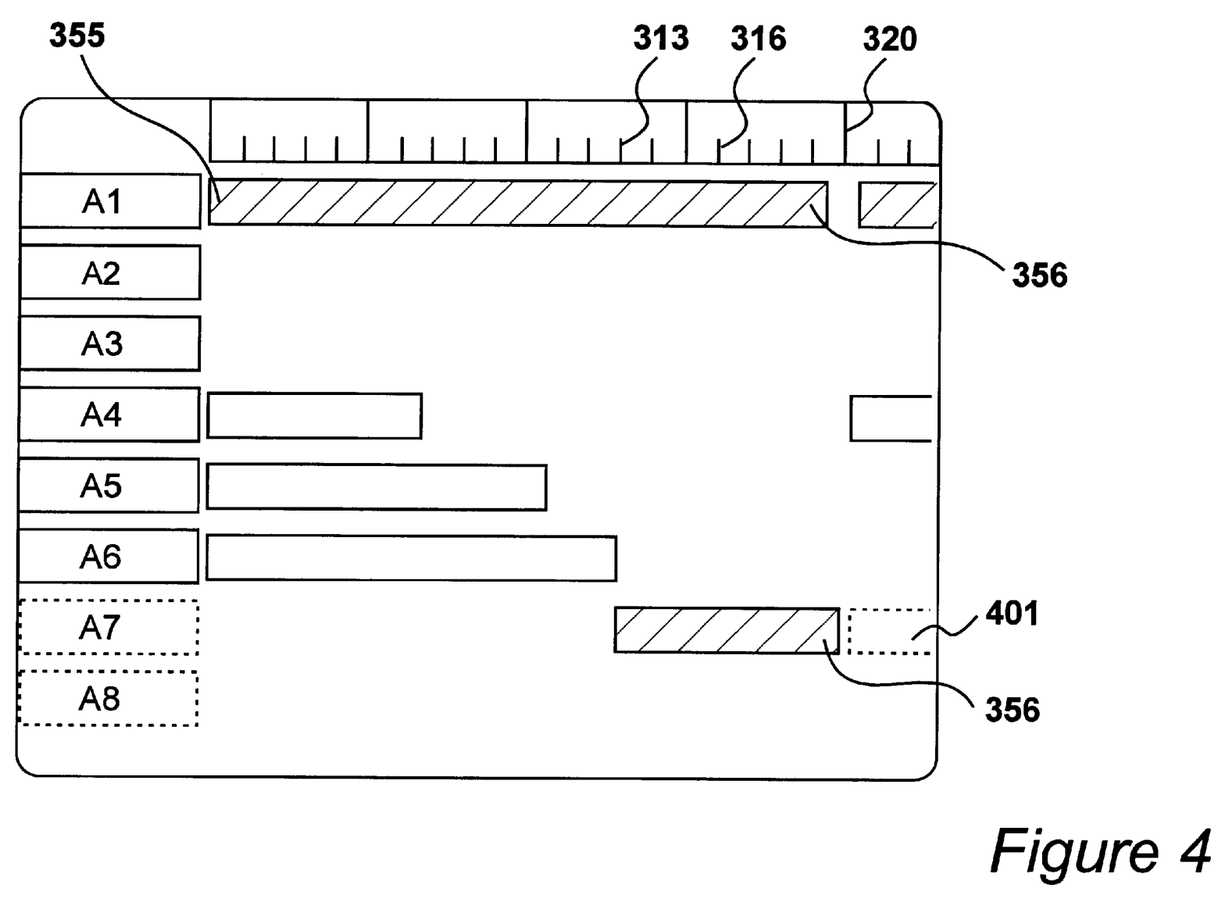
FIG. 4 details audio tracks shown in FIG. 3.

The audio tracks shown in FIG. 3 are detailed in FIG. 4, in which account has been taken of the fact that, during the audio dissolve or cross fade 354, two audio sources are required to be active in order to satisfy the effect specified in audio track A1. During the playback of audio track A1, two audio sources are required over frames 313 to frame 320. This requirement is satisfied if material is replayed via an additional active track. Thus, as shown in FIG. 4, the requirement for input material 356 may be transferred from audio track A1 to new audio track A7. Thus, from frame 313 to frame 320, source material 355 is supplied via audio track A1 with source material 356 being to supplied via audio track A7.

After frame 320, audio source 356 could continue to be supplied via audio track A7, as indicated by outline 401. However, the system only guarantees the ability to play back six audio tracks in real time, therefore it is preferable for source material 356 to be replayed via audio track A1 from frame 321 onwards, so that audio track A7 may be muted. Thus, it is possible for audio track A7 to be rendered active only for the period during which it is required, whereafter the track is automatically muted so as to reduce processing burden. However, over the period of output frames 313 to 320, it is necessary to receive and process audio signals from seven audio tracks; a situation which is likely to result in system degradation.

Figure 5:
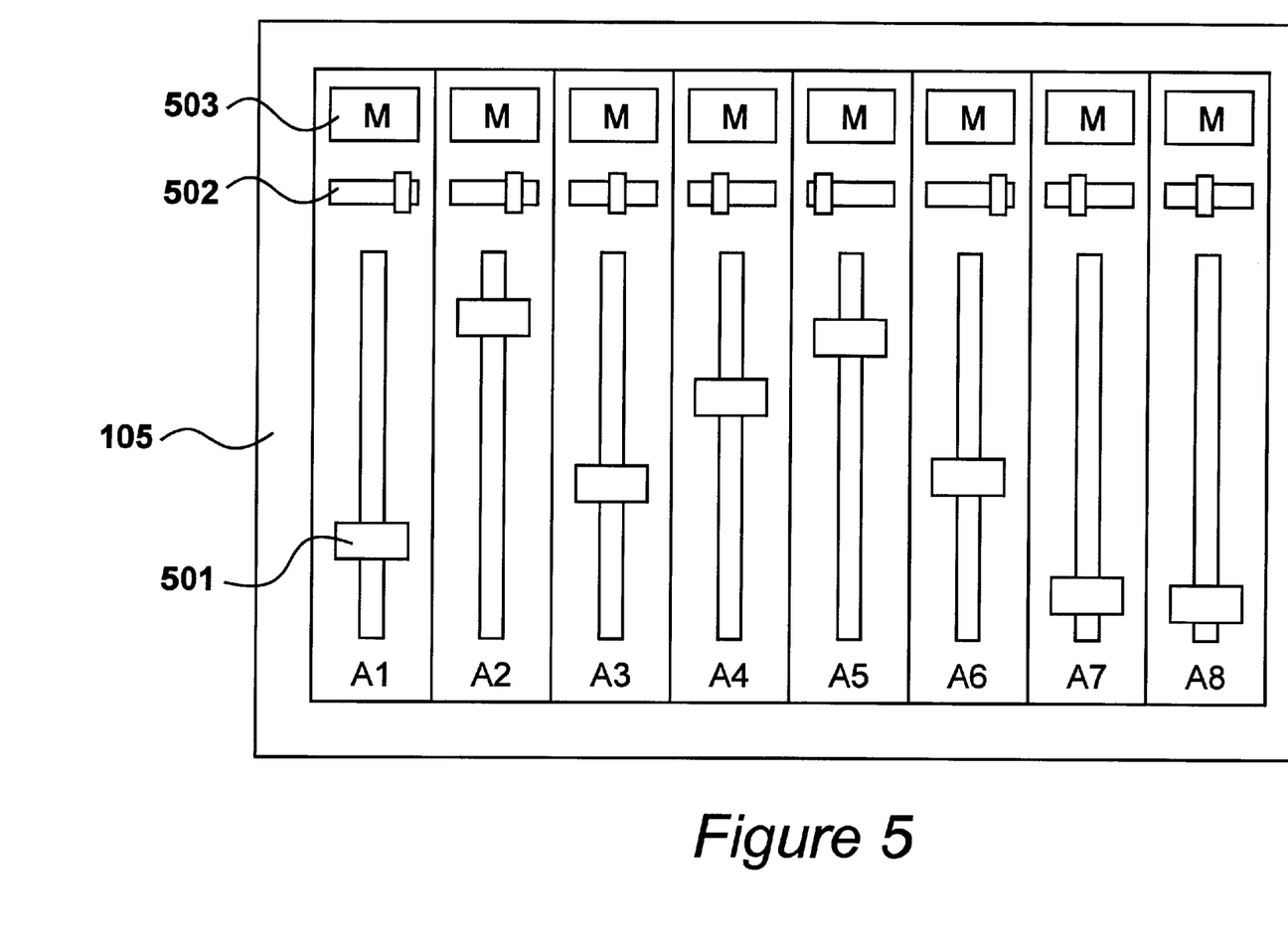
FIG. 5 illustrates an attribute window displayed on one of the monitors shown in FIG. 1.

In addition to representing time line edits as shown in FIG. 3, an attribute window may be selected, and displayed on monitor 105, as shown in FIG. 5. The attribute window allows attributes to be defined for each of the audio tracks. Sliders are presented to an operator on monitor 105 and an operator may adjust these sliders by operation of the mouse 103. A first slider 501 allows the overall volume level of audio track A1 to be adjusted. In addition, a panning slider 502 allows the pan, i.e. stereo position, of audio channel A1 to be selected. The audio channel is also provided with a mute button 503 such that, when selected, audio channel A1 is muted, thereby reducing processing burden.

Thus, for each of the audio tracks it is possible to define attribute data in terms of volume and pan on a frame by frame basis. Alternatively, if required, attributes for volume and pan may be stored at sub-frame definition and, in the ultimate case, volume and pan values could be stored for each individual audio sample. However, in the preferred embodiment, audio attributes, specifically volume and pan values, are specified on a frame by frame basis for each frame period of each audio track. During real time playback, sub-frame volume and pan values are computed for each one sixteenth of a frame using linear interpolation between the attribute values specified by the user at the neighbouring frame boundaries.

Audio samples will generate a click if attenuated too abruptly. Thus, when a user specifies a cut at an event in or out point, the system can be set up so as to automatically ramp up or down to or from the maximum amplitude specified for the track. The user can specify the duration of the ramp in or out, in terms of a percentage of frame length, from zero to one hundred percent. If set to zero, there will be no ramp effect. This situation is suitable for conditions where the track contains only very low level background noise, and no resulting click would be audible. When set to one hundred percent, the ramp is at its slowest, and the audio signal is introduced or faded out slowly enough that no clicks or aliasing artefacts are audible. The sample amplitude factor, that changes in response to the ramp effect being defined in this way, is therefore computed on a sample by sample basis, so that stepping is avoided, and a smooth response is obtained during playback. It should be appreciated that more audio tracks may be processed if said tracks are processed at lower bandwidths. However, in the preferred embodiment, a sampling rate of 48 kHz is used with sixteen bits being allocated to each left and to each right audio sample.

Figure 6:
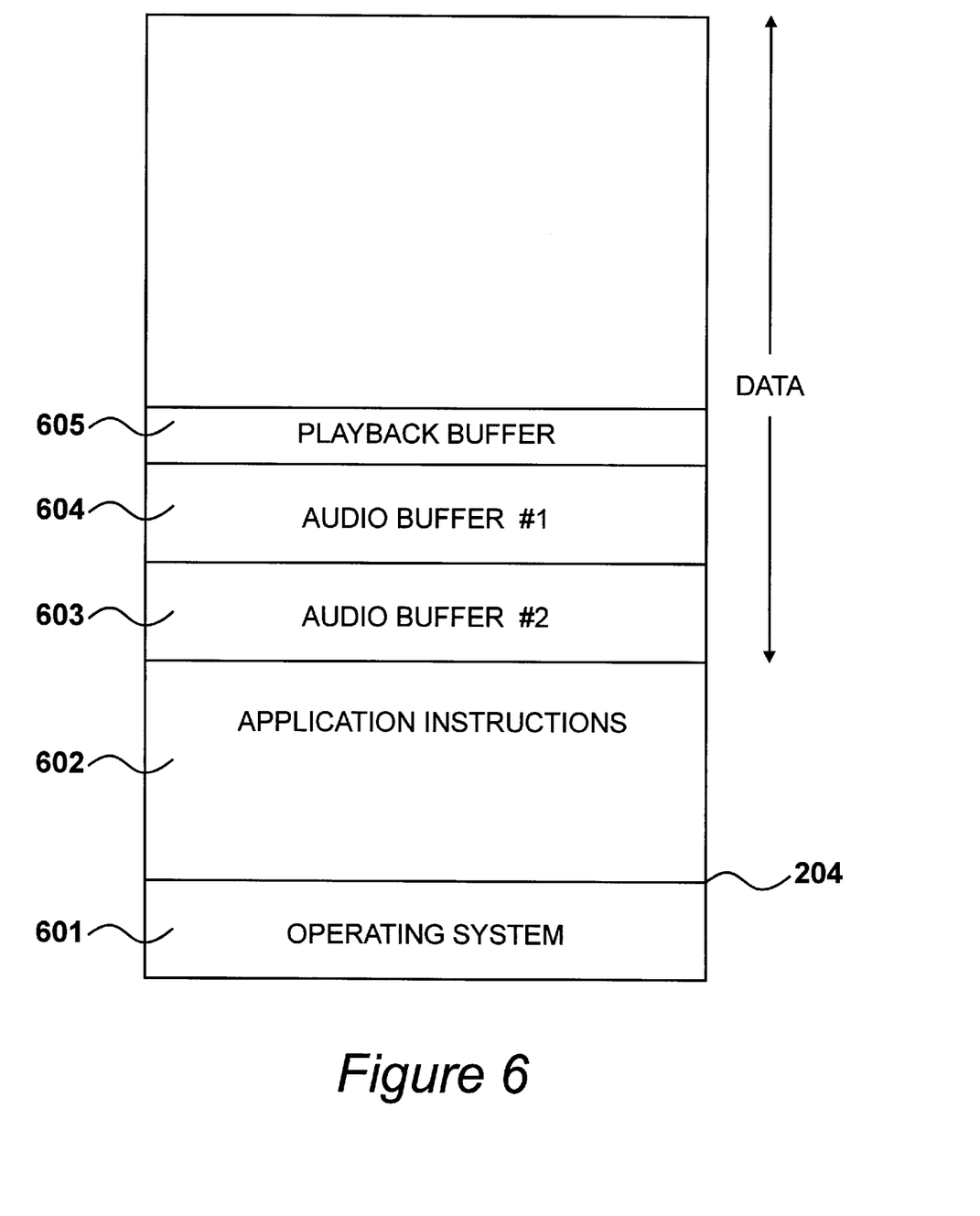
FIG. 6 illustrates the arrangement of data contained within the memory device shown in FIG. 2.

In order to process each audio track, it is necessary to calculate left channel and right channel contributions by performing a multiplication upon each audio sample. Thus, processing units 201 and 202 are required to manipulate samples on a sample by sample basis in order to generate the output data. To facilitate this process, audio data from the audio data store 212 is written to relatively large buffers within memory 204, as shown in FIG. 6. Within the overall system memory 204, instructions for the operating system are stored at location 601. Similarly, application instructions are stored at locations 602 with the locations above 602 being available for the storing and buffering of application data.

Locations 603 provide a first audio buffer with locations 604 providing a second audio buffer. In this way, double buffering is facilitated such that one of said buffers may receive data from the audio store 212 while the other buffer is providing data to be mixed. Thus, data may be written to a buffer efficiently as a substantially constant stream from the storage devices 212 whereafter the data may be accessed randomly from the other buffer.

Mixed data is written to a playback buffer in storage location 605 and this data is then read to provide a framesworth of mixed data to the audio-visual subsystem 208.

The transfer of data over the PCI bus 203 is effectively interrupt driven and CPU 201 is responsible for bus mastering and for controlling interrupt priorities. However, the operations performed may be visualised in a more systematic way, as illustrated in FIGS. 7A and 7B.

At step 701 operations effectively remain in a standby mode until the user requests an operation to be performed. At step 702 the user has performed an edit operation that results in a change being made to the event structure of the tracks, and therefore possibly resulting in a change in the way that the tracks can be optimised. As a result of this change, at step 703, the tracks are optimised for playback. The audio visual data stored on storage devices 211 and 212 is in the form of digital samples which are read in response to edit events defined by the timeline shown in FIG. 3. A plurality of active tracks may be processed in real time and the optimisation process is performed so as to mitigate the effect of reading data which has been created as a single track but in actual fact requires two tracks of material to be read. An event of this type, such as a dissolve, wipe or similar audio transition, is optimised by optimisation process 703. Conventionally, upon detecting such a situation, it would be necessary to activate another track and to require the reading of data from the new active track which, in some circumstances, may degrade the operation of the system. However, in the present embodiment, material for one of the interacting tracks is associated with a blank region of another active track thereby allowing both of the interacting tracks to be read without requiring an additional active track. Thus, optimising step 703 consists of optimising track events for conditions such as audio dissolves and reallocating a portion of track material to a blank portion of an already active track, so as not to require a non-active track to be activated. After optimisation step 703, control is directed back to step 701, where the process enters a standby mode of operation until the next event occurs. The sequence of operations illustrated in FIG. 7A does not attempt to fully describe the processes performed by the processing system shown in FIG. 2, as there are many processes being performed in accordance with multitasking protocols under the control of the operating system. What FIG. 7A illustrates, is that optimisation is performed when the user defines a change in data in such a way that it then becomes necessary for a new optimisation to be performed.

Figure 7A:
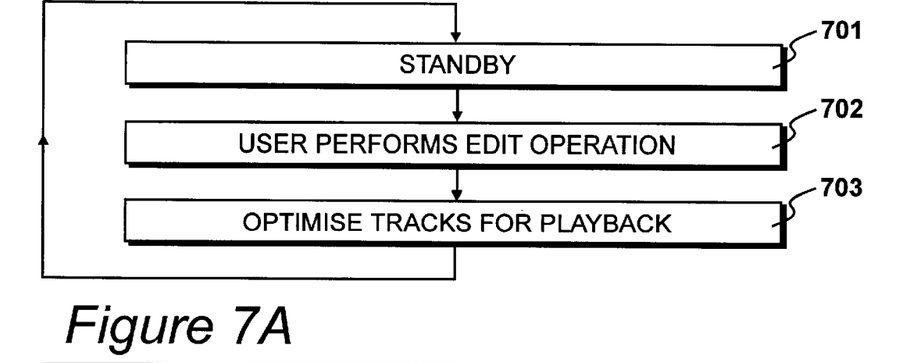
FIG. 7A illustrates the editing of audio data by the system shown in FIG. 1, including a step for the optimisation of tracks for audio playback.
Figure 7B:
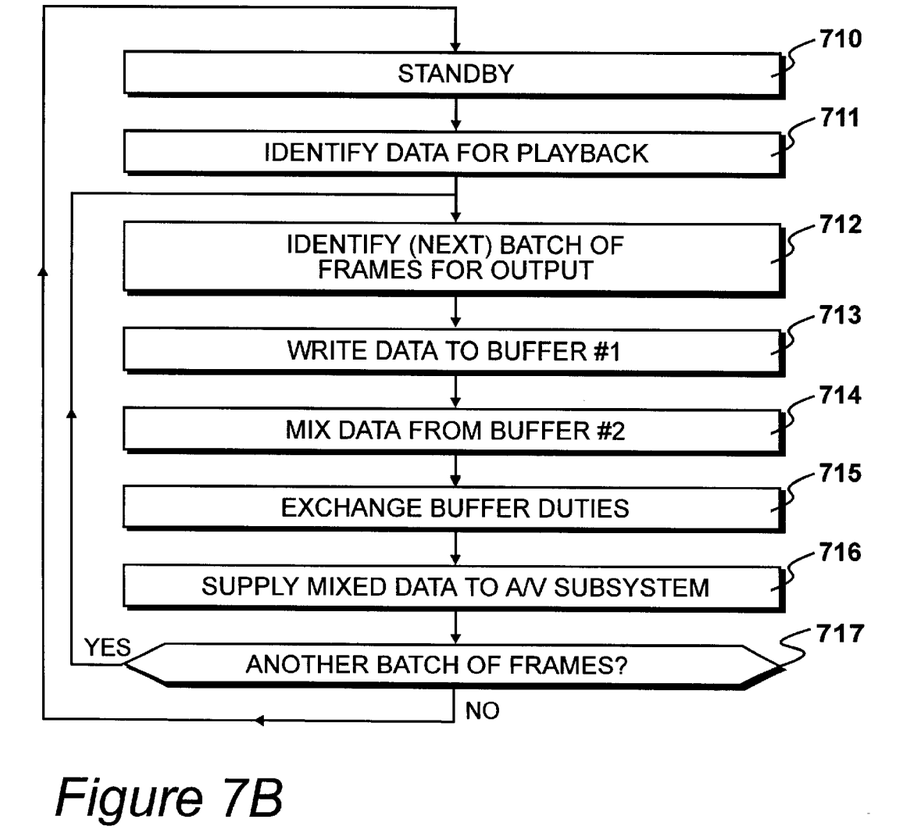
FIG. 7B illustrates the playing of audio data optimised in FIG. 7A, including a step of mixing audio data.

As a result of optimisation 703 shown in FIG. 7A, the processes shown in FIG. 7B may be effected with greater efficiency. The transfer of video data from video store 211 to the audio/video subsystem 208 is performed under the control of CPU 201, and the majority of the actual video processing is performed by the subsystem 208. The procedures identified in FIG. 7B are therefore directed towards the processing of the audio data. At step 710, the process is in a standby mode. At Step 711, the user has requested a playback to begin. Optimisation has already been carried out at step 702 in preparation for playback, which then proceeds at step 711. At step 711 data for playback is identified. This includes data already held in local memory 204, but typically will also require access to long term memory storage, such as the hard discs 211 and 212. At step 711, therefore, preparations are made to ensure that data is available with sufficient speed to keep up with demands for real time playback. At step 712, a batch of frames is identified for output. The number of frames selected depends on a number of factors, including overall processor usage, and the size of free memory. Step 712 attempts to ensure that efficient use is made of the available processing resources. For example, if this was not done, it is possible that an attempt would be made to allocate memory resources for data beyond those which are currently available, resulting in a time consuming delay while resources are adjusted. Avoidance of these types of delays is crucial to obtaining real time performance.

At step 713 new data is read from the audio disc 212 and written to buffer number one. At step 714 data is read form buffer number two and mixed so as to write stereo data to the playback buffer 605. At step 715 buffer duties for audio buffer number one and audio buffer number two are exchanged and at step 716 the mixed audio data from the playback buffer 605 is supplied over the PCI bus 203 to the audio video subsystem 208. A question is asked at step 717 as to whether another batch of frames is to be processed and when answered in the affirmative control is returned to step 712. Eventually, the playback will have been completed and the system will return to its standby condition at step 710.

Without optimisation process 703, the dissolve 354 shown in FIG. 3 would result in audio channels being processed as illustrated in FIG. 4. The dissolve 354 may be considered as a portion of the playback during which a tail of source material 355 is being processed in combination with a head of material 356. In order to allocate the material onto individual audio tracks, it would be possible to move the tail of track 355 or to move the head of track 354. By convention, in the present embodiment, tails are retained in their specified tracks and heads are transferred.

Figure 8A:
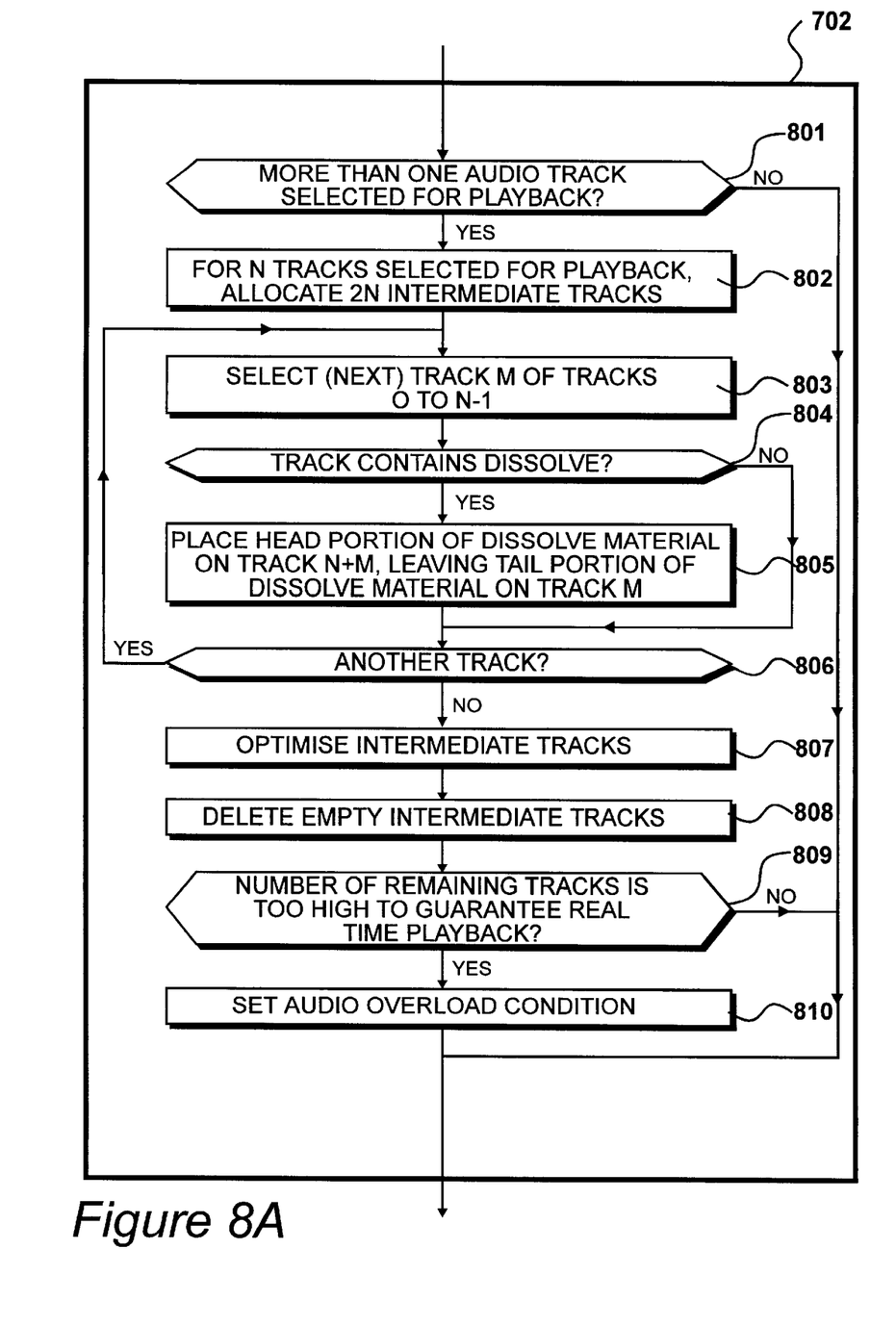
FIG. 8A details the track playback optimisation process identified in FIG. 7, including a step of optimising intermediate tracks.

Step 702 for the optimisation of tracks for playback is shown in FIG. 8A. At step 801 a question is asked as to whether more than one audio track has been selected for playback. If answered in the negative, no optimisation is necessary. Alternatively, if optimisation is necessary, control is directed to step 802. At step 802, a number of intermediate tracks are generated. The intermediate tracks are never noticed by the user, but are generated for efficient use of processing resources when audio tracks are being played. For a number N of audio tracks defined by the user, 2N intermediate tracks are required, thus an additional N tracks are created in addition to the original user-specified tracks. At step 803 a track is selected from the first N intermediate tracks. On the first pass through the processes illustrated in FIG. 8A, the track selected will be track 0. On the next pass, the track selected will be track 1, and so on, up to track N−1. The selected track number is designated as track M. At step 804 a question is asked as to whether the currently selected track contains a dissolve, or in other words, does the track contain data that in reality requires a pair of tracks during playback. A dissolve has this requirement, as two sources of audio data are combined because it requires two audio tracks to be made available simultaneously. If the question asked at step 804 is answered in the negative, control is directed to step 806. Alternatively, control is directed to step 805.

At step 805, the presence of dissolve material has been identified. The dissolve material comprises two parts: a head portion and a tail portion. The head portion is the material on the track leading up to and including material contributed during the dissolve, and the tail portion is the remaining material on the track including material contributing to the dissolve. At step 805, the head portion is placed on track N+M, and the remaining material, including the tail portion, is placed on track M. In step 805, this is performed for each instance of a dissolve that is encountered on the track. In every case, material is added with attribute data to show which user track the material came from, whether it came from the head or tail of a transition, or neither, as well as other data needed for real time playback.

After step 805, control is directed to step 806, where a question is asked as to whether another track is to be considered. This condition is satisfied when M is less than N, in which case control is directed back to step 803. Alternatively, if all of the original source tracks have been considered, control is thereafter directed to step 807. At step 807 the arrangement of material on the intermediate tracks is optimised, resulting in a reduction in the number of intermediate tracks required during playback. At step 808, empty tracks, resulting from the optimising process at step 807, are deleted. This reduces the processing requirements for playback. At step 809 a question is asked as to whether the total number of remaining tracks is too high to guarantee real time playback. In the present embodiment, this number is six. In an alternative embodiment, the number could be variable, depending upon the other tasks required to be performed by the processing system, for example, the number of video channels being played back. If the number of audio channels is too high, control is directed to step 810, where an audio overload condition is set. Alternatively, it is known that the processor can provide sufficient power to play back the audio tracks in real time, and it is unnecessary to set the audio overload condition. This completes the operations for optimising tracks for playback.

Figure 8B:
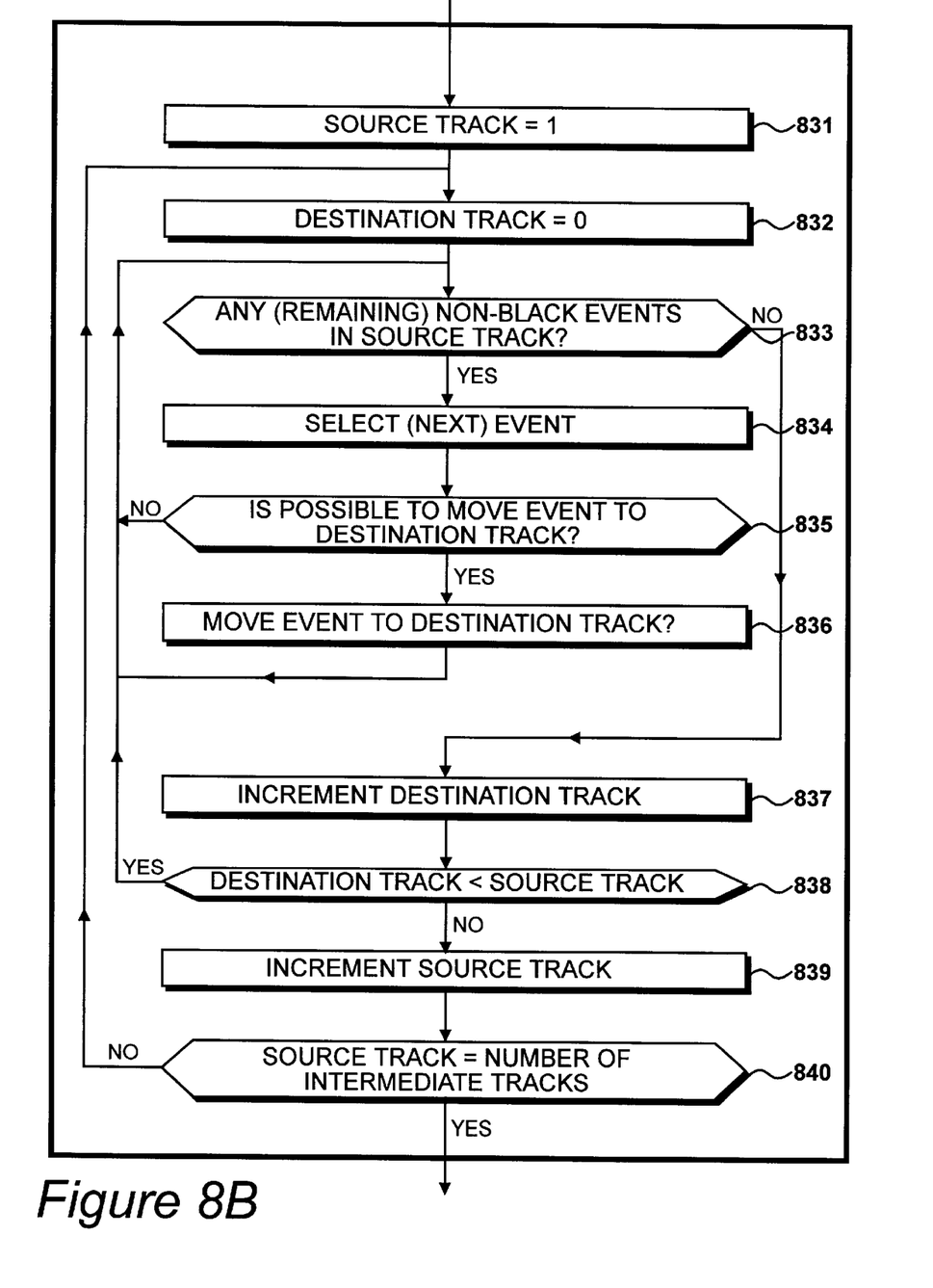
FIG. 8B details the step of optimising intermediate tracks identified in FIG. 8A.

The process for optimising intermediate tracks, indicated at step 805 in FIG. 8A is detailed in FIG. 8B. At step 831 the source track is selected initially as being track one. At step 832, the destination track is selected initially as being track zero. For the purposes of this flow chart, tracks are considered as being numbered from zero to 2N-1, where 2N is the number of intermediate tracks. At step 833, a question is asked as to whether there are any non-black events in the source track. A non-black event contains audio material that is currently activated for playback on a particular track. If answered in the negative, control is directed to step 837. Alternatively, control is directed to step 834. At step 834 the next non-black event in the track is selected. At step 835 a question is asked as to whether it is possible to move the selected event to the destination track. If there is sufficient room on the destination track for the entire length of the selected event, then it is possible to move the event. If the question asked at step 835 is answered in the negative, control is directed to step 833, where another event is considered for moving. Alternatively, control is directed to step 836, where the selected event is moved to the destination track. Thereafter, control is directed back to step 833, where any remaining non-black events on the source track are considered.

If the question asked at step 833 is answered in the negative, and no suitable events remain on the source track, control is directed to step 837. At step 837 the destination track is incremented. At step 838 a comparison is made between the value of the destination track and the value of the source track. If the destination track is less than the source track, control is directed to step 833, where the next destination track can be considered. Alternatively, control is directed to step 839, where the source track is incremented. Thereafter, at step 840, a comparison is made between the value of the source track and the number of intermediate tracks. If these values match, this condition indicates that all the tracks have been considered, and the optimisation process is complete. Alternatively, control is directed back to step 832, where each track in turn, below the value of the source track, is considered as a potential destination track for any events that remain on higher valued tracks. Numerically, the track optimisation proceeds as follows. On the first pass, track one is considered as the source, with only track zero being considered as a destination. On the next iteration, track two is considered as the source, and tracks zero and one are considered as destinations. Next, track three is considered as a source, with tracks zero, one and two considered as destinations. This process is continued for as many source tracks as there are intermediate tracks allocated at step 802. In considering destination tracks in this order, of the lowest going up to the highest, it is most likely to place events on lower numbered tracks. In this way, events are moved, whenever possible, up to lower numbered tracks, and in many practical situations this will result in a number of higher numbered tracks being completely empty at the end of the optimisation process. Furthermore, the algorithm shown in FIG. 8B operates in such a way that the empty tracks will be contiguous. In other words, it will be impossible, at the end of the process, for track four to be empty, and track five to contain events. Instead, there will always be contiguous blocks, so that, for example, tracks zero to four will contain events, and tracks five to twelve will be completely empty. This condition is useful, as it simplifies the process of deleting empty intermediate tracks, as indicated at step 808 shown in FIG. 8A.

Figure 9:
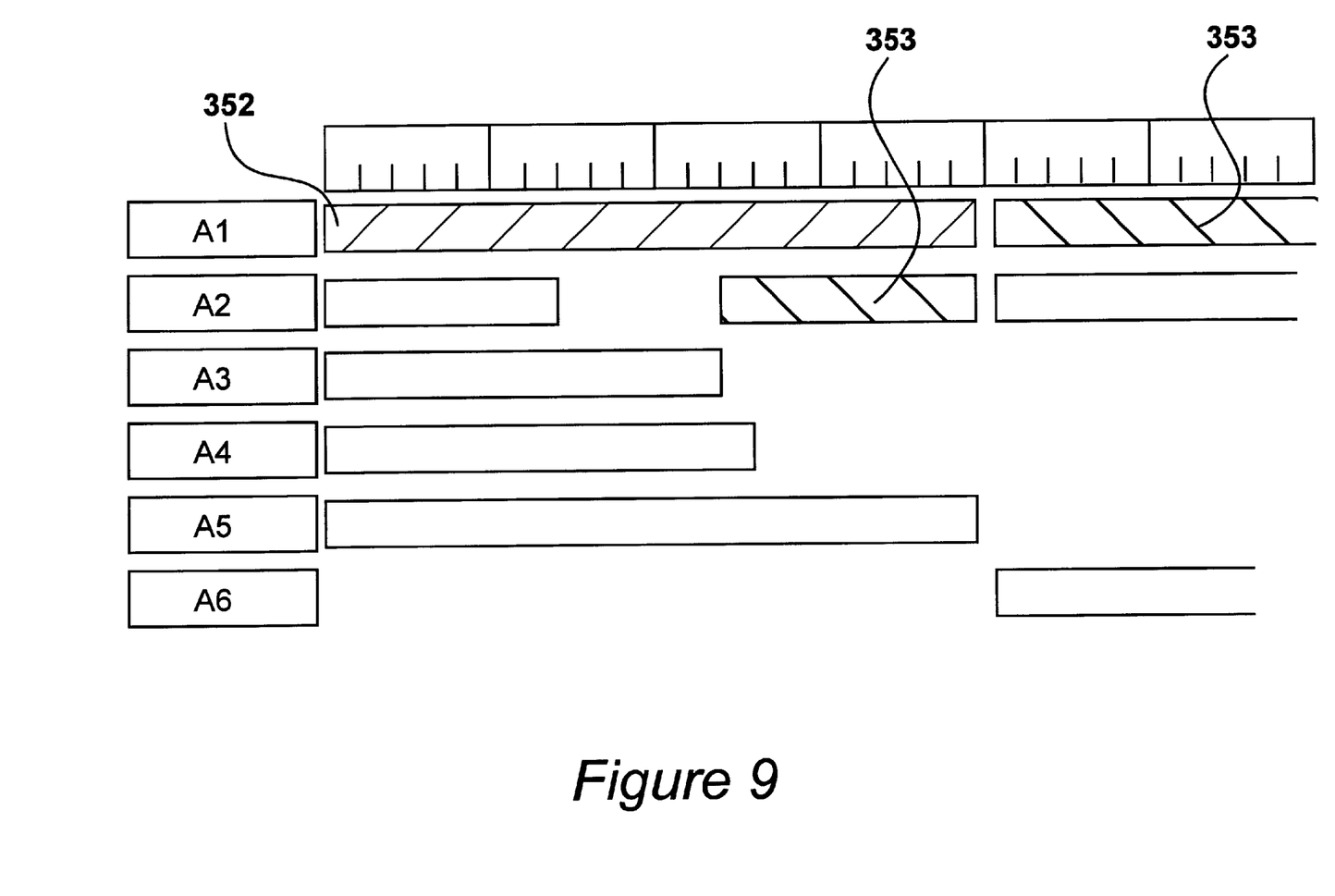
FIG. 9 details the effect of the optimisation procedures shown in FIG. 8 when applied to the audio data tracks shown in FIG. 3; and, FIG. 10 details the step mixing audio data identified in FIG. 7.

The effect of the optimisation procedures shown in FIG. 8A and FIG. 8B, when applied to the condition shown in FIG. 3, is detailed in FIG. 9. Dissolve 354 would be split up at step 805 and at step 807 optimisation would be performed. A gap larger than the length of the dissolve 354 is available in audio track A2, therefore the head of incoming track 356, required for frames 313 to 320, is transferred to audio track 2. Thus, by placing the head of this track in existing audio track 2, it is not necessary to use audio track 7 and all of the required audio data can be replayed in real time through the primary active tracks A1 to A6.

Attribute data for the transferred track is still derived from the attribute track associated with audio track A1. The head of the incoming track has been transferred, and therefore the attribute data available in audio track A1 for frame periods 313 to 320 relates to the tail of outgoing track 355. From frame 321 onwards, attribute data becomes available for the material of source 354. Attribute data for the head of source 354, the audio information which has been transferred to audio track A2 in accordance with the procedures shown in FIG. 9, is derived by interpolating back from values specified from frame 321 onwards. Thus, this allows volume and pan attributes to be calculated for the head of source 354, which are in turn processed with the fading attributes of the dissolve; in order to achieve the required ramping-up of the audio levels as the head of source 356 is played from audio track A2. In all other respects the audio information defined at portion 801 is replayed in the same way as other audio information in accordance with procedures detailed in FIG. 10.

Figure 10:
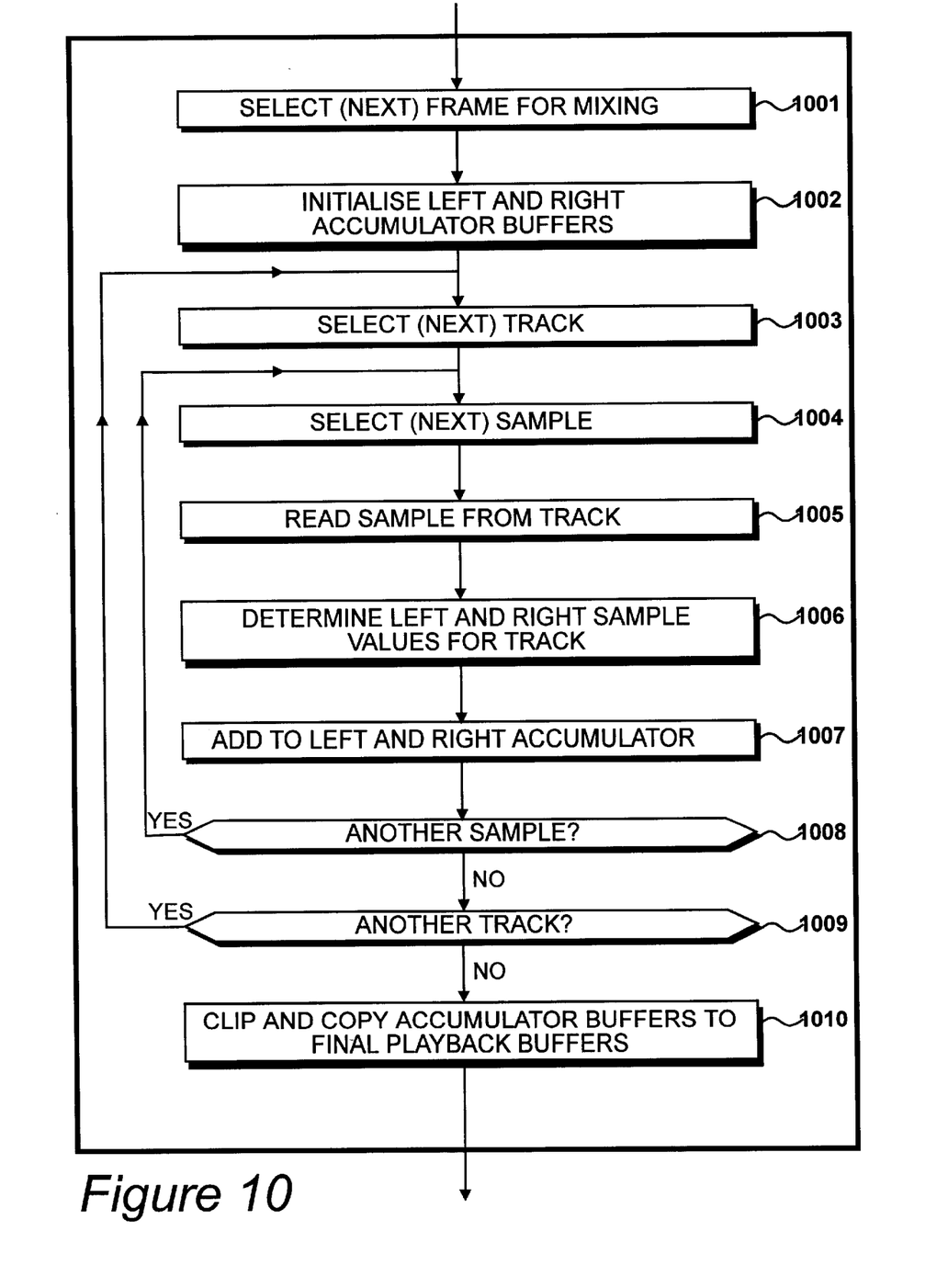

Procedures 714, for mixing audio data read from an audio buffer, are detailed in FIG. 10. In the present embodiment, attributes are defined for each video frame, therefore at step 1001, where the next frame is selected for mixing, attribute data for the frame under consideration is loaded. Output values for the left and right channels are now generated on a sample by sample basis so as to accumulate the required data within playback buffer 605. At step 1002 the left and right accumulator buffers for the duration of the frame are initialised to zero values. At step 1003 the first track is selected. At step 1004 the first sample of the frame is selected. At step 1005 the next left and right samples are read from the track. At step 1006 the left and right output sample values are determined, in response to frame attribute data. At step 1007, these new values are added to the left and right accumulators for that sample number within the frame. At step 1008, a question is asked as to whether any samples remain to be calculated for the current frame. If answered in the affirmative, control is directed back to step 1004, where the next left and right sample pair is considered. Alternatively, control is directed to step 1009, where a question is asked as to whether another track is to be considered for accumulation. If answered in the affirmative, control is directed back to step 1003, where the next track is considered, and steps 1004 to 1009 are repeated. Finally, once all tracks have been considered for the current frame, control is directed to step 1010, where the contents of the accumulator buffers are first clipped, and then copied to the final playback buffers. It can be appreciated that the procedures illustrated in FIG. 10 require significant processing overhead. Thus, by reducing the number of audio tracks which need to be processed in order to supply data to the playback buffer, a significant advantage is provided in terms of releasing processor resource.

The present embodiment has been described on the basis that normal operation is permitted for a certain number of audio tracks whereafter satisfactory processing is not possible if this number of tracks is exceeded. In some applications, a predetermined value for the total number of real time audio tracks permitted may be unspecified and the processing capabilities of a system may be variable depending on the selection of particular requirements. Thus, a user may be able to configure the operation of a system so as to provide optimal operating characteristics for a particular application. Under these circumstances, it may be preferable to optimise the presence of audio dissolves even when relatively few audio tracks have been enabled, on the basis that the number of active audio tracks should always be minimised so as to make processing capabilities available for use on other functions. In this way, further functions may be added to the system and made available when resources permit.

The present invention has been described with respect to the processing of stereo audio tracks. The invention may also be applied to the processing of video or other media tracks. In particular, given that tracks of any media type are represented and manipulated symbolically within the invention, no significant bandwidth restrictions are encountered when applying the invention to media of widely differing types, including high resolution video or film data. Thus, in systems where the number of tracks is limited by processing bandwidth, the invention may be applied advantageously. For example, there may be four or more audio channels per audio track, as is required for surround sound or multi-lingual sound systems. The present embodiment does not automatically result in an optimum arrangement of intermediate audio tracks, although it will usually result in an improvement, and never a degradation in overall system performance. In an alternative embodiment, the process 807 of optimising intermediate tracks, includes steps to obtain an optimal solution. In order to identify an optimal solution, movement of events is prioritised according to their duration. Thus, events which have the longest duration have the higher priority with respect to track movement. In this way, short duration events, which are less likely to overlap, will congregate on tracks with a higher number. A number of passes through this algorithm will enable the optimal solution to emerge, and should not usually result in an excessive extra amount of processing to be performed. The optimal solution is characterised by the condition that the total number of tracks after optimisation is equal to the maximum number of tracks active at any one time, and this is a suitable test for the end condition of the alternative optimisation method.

I claim:

1. Editing apparatus comprising:
    storage means configured to store digital samples;
    display means configured to display symbolic representations of edit events within tracks; and
    processing means configured to identify an event defined on a single track but requiring two interacting tracks, to identify a blank region of another track at a same position as said event, and to transfer material from one of said two interacting tracks to said blank region thereby allowing both of said interacting tracks to be played without allocating additional track resources.

2. Editing apparatus comprising:
    storage means configured to store digital samples;
    display means configured to display symbolic representations of edit events within tracks; and
    processing means configured to identify additional tracks; identify overlapping events on the same track; move an overlapping event to a different track; identify improved locations for events; and identify a reduced number of tracks for subsequent processing.

3. Apparatus according to claim 1, wherein events processed by said processing means are associated with collections of samples of audio data stored by said storage means.

4. Apparatus according to claim 2, wherein said overlapping events detected by said processing means define an audio cross-fade.

5. Apparatus according to claim 2, wherein said display means is configured to display an overlap of audio material in a form substantially similar to a video wipe or a video dissolve.

6. Apparatus according to claim 3, wherein said processing means is configured to process audio samples read from said storage means in combination with digital video samples read from said storage means.

7. Apparatus according to claim 6, wherein said display means is configured to display audio tracks as timelines presented against a shared time axis.

8. Apparatus according to claim 7, wherein the head of an event is moved and parameters for the moved event are determined with respect to parameters for the remaining material.

9. Apparatus according to claim 7, wherein said storage means is configured to record audio parameters for each video frame's-worth of audio samples.

10. A method of processing audio-visual data in which digital samples are read from storage media in response to edit events identified symbolically within tracks, wherein:
    event defined on a single track but requiring two interacting tracks is identified;
    a blank region of another track at a same position as said event is identified; and
    material for one of said two interacting tracks is transferred to said blank region thereby allowing both of said interacting tracks to be played without allocating additional track resources.

11. A method of processing audio-visual data in which digital samples are read from storage media in response to edit events identified symbolically within tracks, including the steps of:
    identifying additional tracks; identifying overlapping events on the same track; moving an overlapping event to a different track; identifying improved locations for events, and identifying a reduced number of tracks for subsequent processing.

12. A method according to claim 10, wherein said events are associated with collections of samples of audio data.

13. A method according to claim 11, wherein said overlapping events form an audio cross-fade.

14. A method according to claim 11, wherein said overlap is represented in a form substantially similar to a video wipe or a video dissolve.

15. A method according to claim 12, wherein said audio samples are processed in combination with digital video samples.

16. A method according to claim 15, wherein video tracks are displayed with audio tracks as timelines presented against a shared time axis.

17. A method according to claim 16, wherein the head of an event is moved and parameters for the moved event are determined with respect to parameters for the remaining material.

18. A method according to claim 16, wherein audio parameters are recorded for each video frame's-worth of audio samples.

19. A computer system configured with a processing capacity and loaded with executable instructions to perform the steps of:
    displaying edit events symbolically in the form of a plurality of tracks;

identifying an event defined on a single track but requiring two interacting tracks;

identifying a blank region of another track at a same position as said event; and transferring material for one of said interacting tracks to said blank region thereby allowing both of said interacting tracks to be played without allocating additional track resources.

20. A computer system configured with a processing capacity and loaded with executable instructions, wherein said executable instructions are configured such that said system:

displays edit event symbolically in the form of a plurality of tracks;

identifies additional tracks;

identifies overlapping events on the same track;

moves an overlapping event to a different track;

identifies improved locations for events; and identifies a reduced number of tracks for subsequent processing.

21. A computer system according to claim 19, programmed such that said events are associated with collections of samples of audio data.

22. A computer system according to claim 20, programmed such that overlapping events representing an audio cross-fade are detected.

23. A computer system according to claim 20, programmed such that said audio overlap is represented in a form substantially similar to a video wipe or a video dissolve.

24. A computer system according to claim 21, programmed to process said audio sample in combination with digital video samples.

25. A computer system according to claim 24, programmed to display video tracks with audio tracks as time lines presented against a shared time axis.

26. A computer system according to claim 25, programmed to move the head of an event and parameters for the moved event with respect to the parameters for the remaining material.

27. A computer system according to claim 25, programmed to record audio parameters for each video frame's-worth of audio samples.

28. A computer-readable medium having computer-readable instructions executable by a computer such that said computer performs the steps of:

displaying edit events symbolically in the form of a plurality of tracks;

identifying an event defined on a single track but requiring two interacting tracks;

identifying a blank region of another track at a same position as said event; and transferring material for one of said interacting tracks to said blank region thereby allowing both of said interacting tracks to be played without allocating additional track resource.

29. A computer-readable medium having computer-readable instructions executable by a computer such that said computer performs the steps of:

displaying edit events symbolically in the form of plurality of tracks;

identifying additional tracks;

identifying overlapping events on the same track;

moving an overlapping event to a different track;

identifying improved locations for events; and identifying a reduced number of tracks for subsequent processing.

30. A computer-readable medium according to claim 28, having computer-readable instructions executable by a computer such that said computer performs the further step of associating said events with collections of samples of audio data.

31. A computer-readable medium according to claim 29, having computer-readable instructions executable by a computer such that said computer perform the further step of associating overlapping events that define an audio crossfade.

32. A computer-readable medium according to claim 29, having computer-readable instructions executable by a computer such that said computer performs the further step of representing an audio overlap in a form substantially similar to a video wipe or a video dissolve.

33. A computer-readable medium according to claim 30, having computer-readable instructions executable by a computer such that said computer performs the further step of processing audio samples in combination with digital video samples.

34. A computer-readable medium according to claim 33, having computer-readable instructions executable by a computer such that said computer performs the further step of displaying video tracks with audio tracks as timelines presented against a shared time axis.

35. A computer-readable medium according to claim 34, having computer-readable instructions executable by a computer such that said computer performs the further step of moving the head of an event and parameters for the moved event with respect to parameters for the remaining material.

36. A computer-readable medium according to claim 34, having computer-readable instructions executable by a computer such that said computer performs the further step of recording audio parameters for each video frame's-worth of audio samples.

* * * * *

UNITED STATES PATENT AND TRADEMARK OFFICE
CERTIFICATE OF CORRECTION

PATENT NO.    : 6,694,087 B1
DATED         : February 17, 2004
INVENTOR(S)   : Dale Matthew Weaver It is certified that error appears in the above-identified patent and that said Letters Patent is hereby corrected as shown below:

Column 12,
Line 25, before "event" insert -- an --.

Signed and Sealed this

First Day of June, 2004

JON W. DUDAS
*Acting Director of the United States Patent and Trademark Office*